United States Patent
Fang et al.

(10) Patent No.: US 10,678,077 B2
(45) Date of Patent: Jun. 9, 2020

(54) DISPLAY DEVICE

(71) Applicant: Coretronic Corporation, Hsin-Chu (TW)

(72) Inventors: Chung-Yang Fang, Hsin-Chu (TW); Ping-Yen Chen, Hsin-Chu (TW); Jen-Wei Yu, Hsin-Chu (TW); Yang-Ching Lin, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/395,263

(22) Filed: Apr. 26, 2019

(65) Prior Publication Data

US 2019/0331944 A1   Oct. 31, 2019

(30) Foreign Application Priority Data

Apr. 28, 2018  (CN) .................... 2018 2 0635679 U

(51) Int. Cl.
*G02F 1/13* (2006.01)
*G02F 1/1337* (2006.01)
(Continued)

(52) U.S. Cl.
CPC ......... *G02F 1/1323* (2013.01); *G02B 6/0053* (2013.01); *G02B 6/0055* (2013.01);
(Continued)

(58) Field of Classification Search
CPC .................................................. G02F 1/1323
See application file for complete search history.

(56) References Cited

U.S. PATENT DOCUMENTS 4,688,900 A  8/1987 Doane et al.
5,301,046 A  4/1994 Konuma et al.
(Continued)

FOREIGN PATENT DOCUMENTS

CN   1702517 A   11/2005
CN   1708704 A   12/2005
(Continued)

OTHER PUBLICATIONS

Yuzo Hisatake, Yasushi Kawata, Akio Murayama; "Viewing Angle Controllable LCD Using Variable Optical Compensator and Variable Diffuser"; May 25, 2005; SID 05 Digest 1218-1221; ISSN/0005-0966X/05/3602; BNSDocID: XP-001244346.

*Primary Examiner* — Sang V Nguyen

(57) ABSTRACT

A display device comprises a backlight module, a display panel disposed on the backlight module, and an electrically controlled viewing angle switching device disposed on the backlight module and disposed in a stacking manner with the display panel. The display panel comprises a panel module and a first polarizer. There is an air layer or a bonding layer between the electrically controlled viewing angle switching device and the display panel. The panel module is disposed between the first polarizer and the electrically controlled viewing angle switching device. The electrically controlled viewing angle switching device comprises a liquid crystal cell, at least one phase compensation film and two second polarizers. The liquid crystal cell is disposed between the two second polarizers. The display device can switch between an anti-peeping mode and a sharing mode in an electrically controlled manner.

29 Claims, 13 Drawing Sheets

(51) Int. Cl.
  *F21V 8/00* (2006.01)
  *G02F 1/13363* (2006.01)
  *G02F 1/1335* (2006.01)

(52) U.S. Cl.
  CPC ...... *G02F 1/1337* (2013.01); *G02F 1/133528* (2013.01); *G02F 1/133634* (2013.01); *G02F 2001/133531* (2013.01); *G02F 2202/28* (2013.01); *G02F 2413/01* (2013.01); *G02F 2413/02* (2013.01); *G02F 2413/05* (2013.01); *G02F 2413/06* (2013.01); *G02F 2413/08* (2013.01); *G02F 2413/11* (2013.01); *G02F 2413/12* (2013.01); *G02F 2413/14* (2013.01)

(56) References Cited

U.S. PATENT DOCUMENTS

| | | |
|---|---|---|
| 7,880,843 B2 | 2/2011 | Morishita et al. |
| 8,982,300 B2 | 3/2015 | Umemoto |
| 10,216,018 B2 | 2/2019 | Fang et al. |
| 2002/0130989 A1 | 9/2002 | Nakao et al. |
| 2005/0206814 A1* | 9/2005 | Histake ............... G02F 1/1323 349/112 |
| 2006/0103782 A1 | 5/2006 | Adachi et al. |
| 2007/0188686 A1* | 8/2007 | Yano .................... G02B 27/281 349/119 |
| 2007/0236939 A1 | 10/2007 | Ouderkirk et al. |
| 2009/0015540 A1 | 1/2009 | Suzuki |
| 2009/0061192 A1* | 3/2009 | Mizutani ............... G02B 5/08 428/220 |
| 2009/0174843 A1* | 7/2009 | Sakai ................. G02F 1/13471 349/74 |
| 2010/0149459 A1 | 6/2010 | Yabuta et al. |
| 2010/0265435 A1 | 10/2010 | Hwang et al. |
| 2010/0289989 A1 | 11/2010 | Adachi et al. |
| 2011/0309398 A1 | 12/2011 | Ito et al. |
| 2011/0315297 A1* | 12/2011 | Koshio ................. G02F 1/1309 156/64 |
| 2014/0232960 A1 | 8/2014 | Schwartz et al. |
| 2015/0208537 A1 | 7/2015 | Cho et al. |
| 2015/0277012 A1 | 10/2015 | Nakamura et al. |
| 2015/0323723 A1* | 11/2015 | Lai ...................... G02B 5/3025 359/489.07 |
| 2015/0346532 A1 | 12/2015 | Do et al. |
| 2016/0356943 A1 | 12/2016 | Choi et al. |
| 2017/0213874 A1 | 7/2017 | Liu et al. |
| 2017/0357111 A1* | 12/2017 | Fang ...................... G02F 1/137 |
| 2018/0113334 A1* | 4/2018 | Fang ...................... G02F 1/13363 |
| 2018/0122292 A1* | 5/2018 | Ju ......................... G02B 3/0031 |
| 2018/0188603 A1* | 7/2018 | Fang ..................... G02F 1/1323 |
| 2018/0210243 A1* | 7/2018 | Fang ...................... G02F 1/137 |
| 2018/0275445 A1* | 9/2018 | Katagiri ............. G02F 1/13452 |
| 2018/0335656 A1 | 11/2018 | Chen et al. |
| 2019/0162991 A1* | 5/2019 | Hagiwara ............ G02F 1/1334 |
| 2019/0196236 A1 | 6/2019 | Chen et al. |

FOREIGN PATENT DOCUMENTS

| | | |
|---|---|---|
| CN | 101473168 A | 7/2009 |
| CN | 101661190 A | 3/2010 |
| CN | 202141874 U | 2/2012 |
| CN | 206920756 U | 1/2018 |
| CN | 208126055 U | 11/2018 |
| EP | 2051134 A1 | 4/2009 |
| JP | P2008003450 A | 1/2008 |
| JP | P2008096458 A | 4/2008 |
| JP | P2009522601 A | 6/2009 |
| JP | P4369222 B2 | 11/2009 |
| JP | P2011002596 A | 1/2011 |
| TW | 200613801 A | 5/2006 |
| TW | 200624912 A | 7/2006 |
| TW | 200714943 A | 4/2007 |
| TW | 200807083 A | 2/2008 |
| TW | 200903053 A | 1/2009 |
| TW | I309312 B | 5/2009 |
| TW | I326367 B | 6/2010 |
| TW | 201031969 A | 9/2010 |
| TW | I356937 B | 1/2012 |
| TW | 201350985 A | 12/2013 |
| TW | 201403577 A | 1/2014 |
| TW | 201610512 A | 3/2016 |
| TW | M537663 U | 3/2017 |
| TW | I612360 B | 1/2018 |
| WO | 2016195786 A1 | 12/2016 |
| WO | 2018130044 A1 | 7/2018 |

* cited by examiner

DISPLAY DEVICE

CROSS-REFERENCE TO RELATED APPLICATION

This application claims the priority benefit of China application (CN201820635679.5), filed on Apr. 28, 2018. The entirety of the above-mentioned patent application is hereby incorporated by reference herein and made a part of this specification.

FIELD OF THE INVENTION

The invention relates to a display device, and in particular to a display device which has an anti-peeping mode and a sharing mode controlled in an electrical manner.

BACKGROUND OF THE INVENTION

At present, when anti-peeping is required for a display device, usually a light control film is placed on the display panel or the backlight module to filter out the large-angle light; when anti-peeping is not required, the light control film must be manually removed. The general light-control films on the market are usually the optical films having a black fine louver structure such as the light control film (LCF) containing a screen privacy film or the advanced light control film (ALCF) of 3M.

However, the optical film described above is relatively expensive and increases product cost. The optical film must be manually placed on or removed from the display panel, which is inconvenient. In addition, the light control film has a periodic structure and is liable to generate a Moiré pattern with the display panel. Furthermore, the light control film causes a decreased brightness of the display device, for example, a decrease of about 30%.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display device, which has an anti-peeping mode and a sharing mode switched by an electrically controlled manner.

Other advantages and objects of the invention may be further illustrated by the technical features broadly embodied and described as follows.

In order to accomplish one or a part or all of the above or other purposes, the display device provided by the invention has a viewing angle control direction. The display device comprises a backlight module, a display panel and an electrically controlled viewing angle switching device. The display panel is disposed on the backlight module. The display panel comprises a panel module and a first polarizer. The electrically controlled viewing angle switching device is disposed on the backlight module and disposed in a stacking manner with the display panel. There is an air layer between the electrically controlled viewing angle switching device and the display panel. The panel module is disposed between the first polarizer and the electrically controlled viewing angle switching device. The electrically controlled viewing angle switching device comprises a liquid crystal cell, at least one phase compensation film and two second polarizers. The liquid crystal cell is disposed between the two second polarizers. The at least one phase compensation film is disposed at least between one of the second polarizers and the liquid crystal cell.

In order to accomplish one or a part or all of the above or other purposes, the display device provided by the invention has a viewing angle control direction. The display device comprises a backlight module, a display panel and an electrically controlled viewing angle switching device. The display panel is disposed on the backlight module. The display panel comprises a panel module and a first polarizer. The electrically controlled viewing angle switching device is disposed on the backlight module and disposed in a stacking manner with the display panel. There is an bonding layer between the electrically controlled viewing angle switching device and the display panel. The panel module is disposed between the first polarizer and the electrically controlled viewing angle switching device. The electrically controlled viewing angle switching device comprises a liquid crystal cell, at least one phase compensation film and two second polarizers. The liquid crystal cell is disposed between the two second polarizers. The at least one phase compensation film is disposed at least between one of the second polarizers and the liquid crystal cell, wherein the refraction index of the bonding layer is equal to or less than the refraction index of the two second polarizer of the electrically controlled viewing angle switching device.

The display device of the embodiments of the invention adopts the electrically controlled viewing angle switching device disposed in the stacking manner with the display panel and on the backlight module, wherein there is an air layer between the electrically controlled viewing angle switching device and the display panel, and together with the situation that at least one phase compensation film is disposed between the liquid crystal cell of the electrically controlled viewing angle switching device and the two second polarizers to achieve anti-peeping control. Therefore, the switching between the anti-peeping mode and the sharing mode of the display device can be achieved through the condition whether voltage is applied to the liquid crystal cell of the electrically controlled viewing angle switching device or not.

The display device of the other embodiments of the invention adopts the electrically controlled viewing angle switching device disposed in the stacking manner with the display panel and on the backlight module, wherein there is a bonding layer between the electrically controlled viewing angle switching device and the display panel, wherein the refraction index of the bonding layer is no higher than the refraction index of the two second polarizers of the electrically controlled viewing angle switching device, and together with the situation that at least one phase compensation film is disposed between the liquid crystal cell of the electrically controlled viewing angle switching device and the two second polarizers to achieve anti-peeping control.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
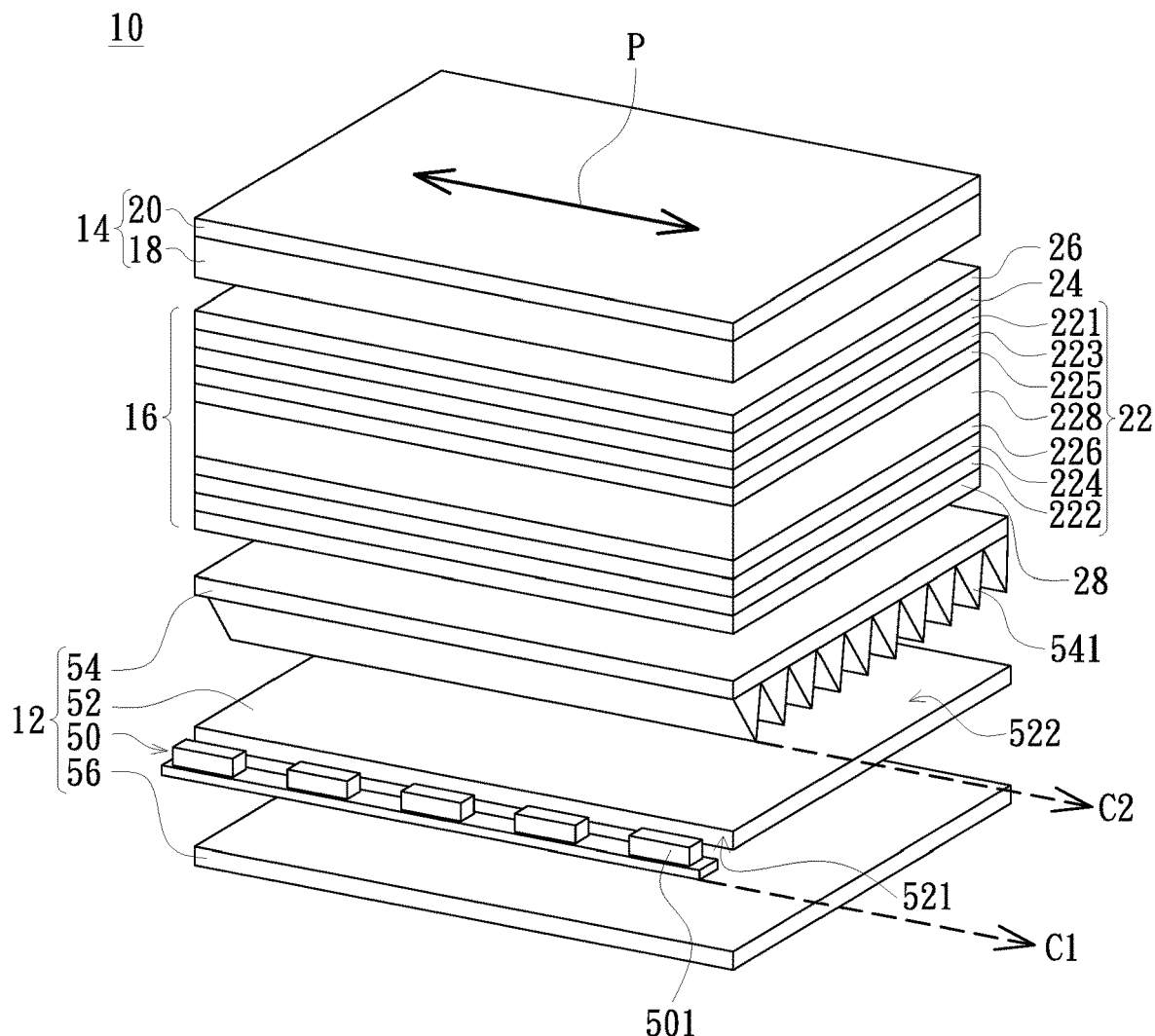
FIG. 1 is a schematic explosive view of the display device of a first embodiment of the invention.
Figure 2:
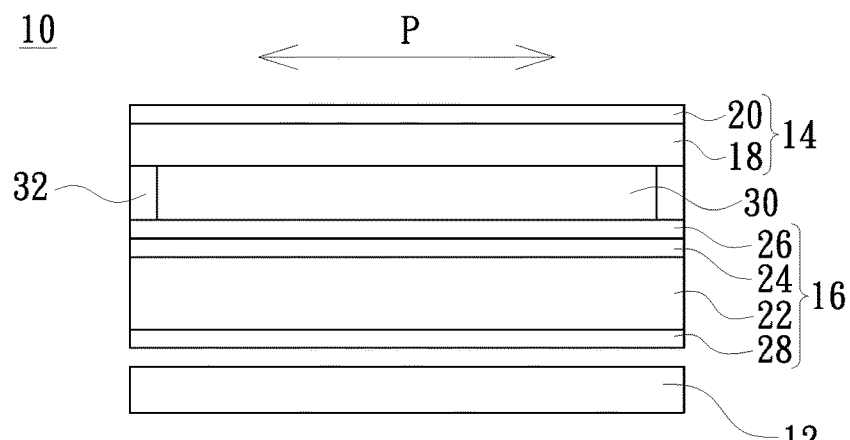
FIG. 2 is a schematic cross-sectional view of the display device of a first embodiment of the invention.

FIG. 1 is a schematic explosive view of the display device of a first embodiment of the invention. As shown in the figure, the display device 10 comprises a backlight module 12, a display panel 14 and an electrically controlled viewing angle switching device 16. The electrically controlled viewing angle switching device 16 and the display panel 14 are disposed in a stacking manner and are disposed on the backlight module 12. In the first embodiment, the electrically controlled viewing angle switching device 16 is disposed between the display panel 14 and the backlight module 12 but not limited thereto. In the display device 10A of a second embodiment described afterwards, the display panel 14 is disposed between the electrically controlled viewing angle switching device 16 and the backlight module 12. The display panel 14 comprises a panel module 18 and a first polarizer 20. The panel module 18 is located between the first polarizer 20 and the electrically controlled viewing angle switching device 16. The electrically controlled viewing angle switching device 16 comprises a liquid crystal cell 22, at least one phase compensation film 24 and two second polarizers. In one embodiment, the two second polarizers are a second upper polarizer 26 and a second lower polarizer 28, respectively. The liquid crystal cell 22 is disposed between the second upper polarizer 26 and the second lower polarizer 28, and the phase compensation film 24 is disposed between the second upper polarizer 26 and the liquid crystal cell 22 but not limited thereto. In other embodiments, the phase compensation film 24 may be of one layer or a plurality of layers, and be disposed between the second upper polarizer 26 and the liquid crystal cell 22, and/or between the second lower polarizer 28 and the liquid crystal cell 22. FIG. 2 is a schematic cross-sectional view of the display device of the first embodiment of the invention. Please refer to FIG. 2 concurrently, that the electrically controlled viewing angle switching device 16 is located between the display panel 14 and the backlight module 12, wherein there is an air layer 30 between the electrically controlled viewing angle switching device 16 and the display panel 14.

Figure 3:
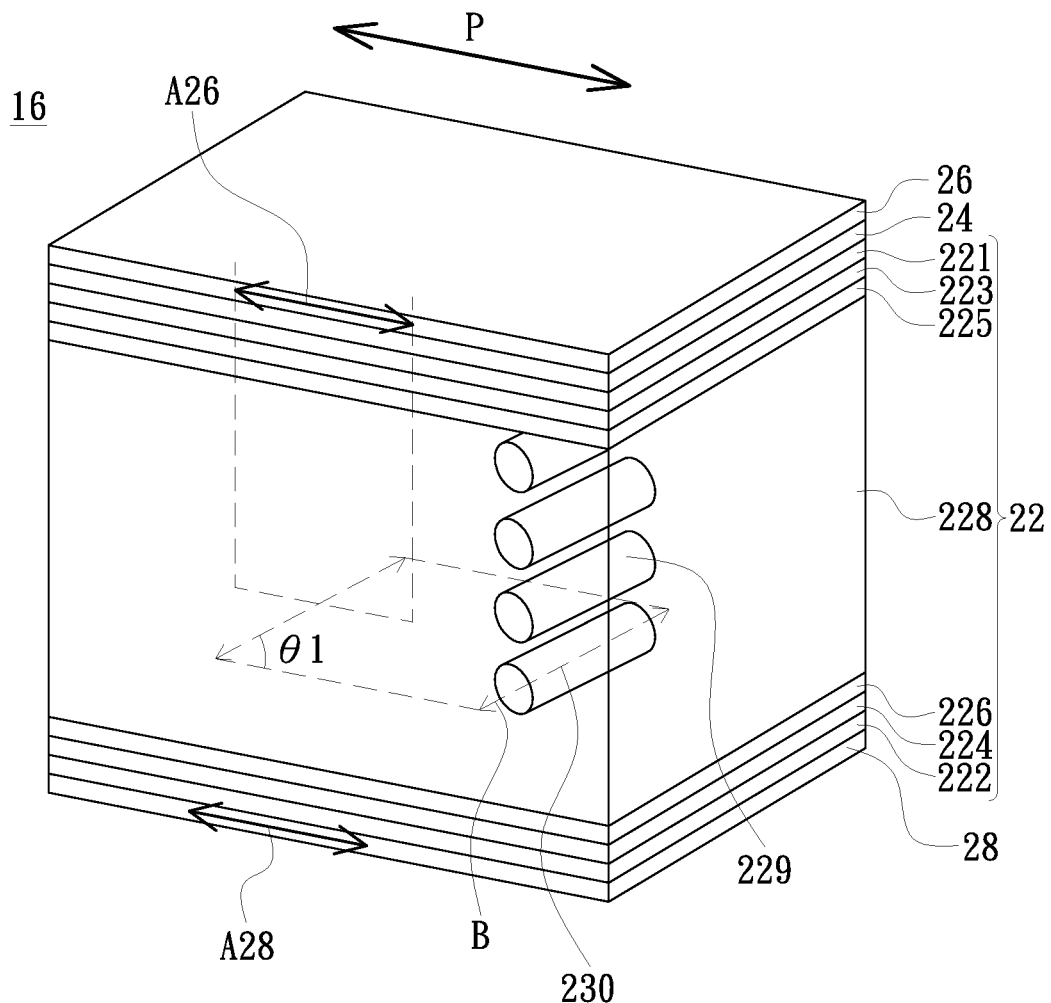
FIG. 3 is a schematic structural view of the electrically controlled viewing angle switching device of an embodiment of the invention.

Continued from the above illustration, that a switching by means of the electrically controlled viewing angle switching device 16 makes the display device 10 be in an anti-peeping mode in a viewing angle control direction P. FIG. 3 is a schematic structural view of the electrically controlled viewing angle switching device of an embodiment of the invention. As shown in the figure, the liquid crystal cell 22 of the electrically controlled viewing angle switching device 16 comprises two substrates, two electrode layers, two alignment layers and a liquid crystal material layer 228. In one embodiment, the two substrates are an upper substrate 221 and a lower substrate 222, respectively. The two electrode layers are an upper electrode layer 223 and a lower electrode layer 224, respectively. The two alignment layers are an upper alignment layer 225 and a lower alignment layer 226, respectively. As shown in FIG. 3, the upper substrate 221 and the lower substrate 222 are disposed between the second upper polarizer 26 and the second lower polarizer 28. In one embodiment, the phase compensation film 24 is located between the upper substrate 221 and the second upper polarizer 26 but not limited thereto. The upper electrode layer 223 and the lower electrode layer 224 are disposed between the upper substrate 221 and the lower substrate 222. In one embodiment, the upper electrode layer 223 and the lower electrode layer 224 are disposed on an interior surface of the upper substrate 221 and an interior surface of the lower substrate 222, respectively, wherein the interior surface of the upper substrate 221 is opposite to the interior surface of the lower substrate 222. The upper alignment layer 225 and the lower alignment layer 226 are disposed between the upper electrode layer 223 and the lower electrode layer 224. In one embodiment, the upper alignment layer 225 is adjacent to the upper electrode layer 223 and the lower alignment layer 226 is adjacent to the lower electrode layer 224. The liquid crystal material layer 228 is disposed between the upper alignment layer 225 and the lower alignment layer 226, wherein the liquid crystal material layer 228 comprises a plurality of liquid crystal molecules 229, and a direction B of an optical axis 230 of the liquid crystal molecules 229 relative to the viewing angle control direction P forms an included angle $\theta 1$ of 70-110 degrees. In one embodiment, as shown in FIG. 3, an axial direction of an absorption axis A26 of the second upper polarizer 26 and an axial direction of an absorption axis A28 of the second lower polarizer 28 are parallel to the viewing angle control direction P.

Figure 4A:
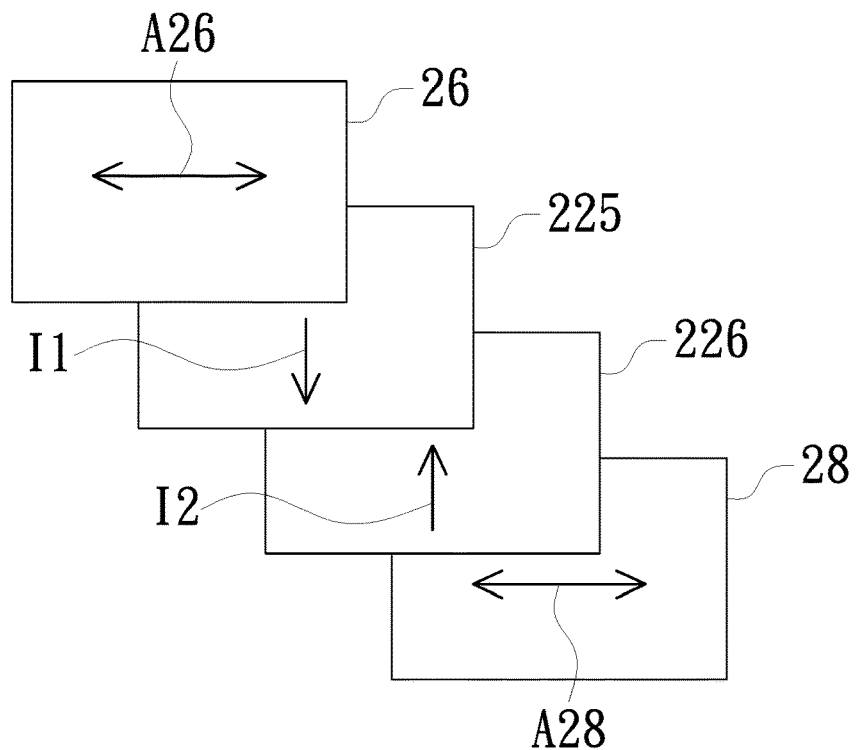
FIG. 4A and FIG. 4B are respectively schematic diagrams showing correspondence of different alignment directions and axial directions of the absorption axis of the polarizers according to an embodiment of the invention.
Figure 4B:
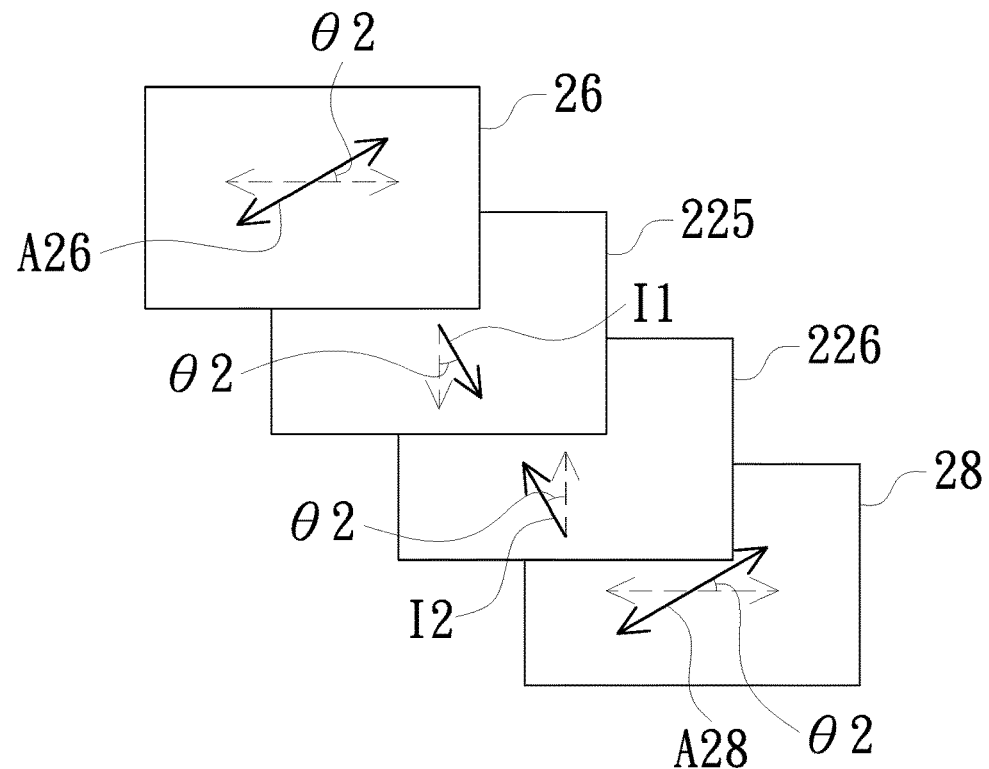

Further, each of the upper alignment layer 225 and the lower alignment layer 226 has an alignment direction. The two alignment directions form respectively included angles of 90±20 and 270±20 degrees with the viewing angle control direction P, and included angles formed between the axial directions of the absorption axis (or transmission axis) of the second upper polarizer 26 and the second lower polarizer 28 and the two alignment directions are selected from one of 0±5 degrees and 90±5 degrees. For example, when the viewing angle control direction P is represented by being toward the azimuth angles of 0 and 180 degrees, the alignment directions of the upper alignment layer 225 and the lower alignment layer 226 may be 90 degrees and 270 degrees respectively, or 90 degrees and 270±20 degrees respectively, or 90±20 degrees and 270 degrees respectively, or 90±20 degrees and 270±20 degrees respectively. The axial directions of the absorption axis (or transmission axis) of the second upper polarizer 26 and the second lower polarizer 28 are arranged corresponding to the alignment directions and perpendicular (or parallel) to the alignment directions. In one embodiment, as shown in FIG. 4A, when the alignment direction I1 of the upper alignment layer 225 and the alignment direction I2 of the lower alignment layer 226 are such as 270 degrees and 90 degrees, respectively, both the axial direction of the absorption axis A26 of the second upper polarizer 26 and the axial direction of the absorption axis A28 of the second lower polarizer 28 are toward 0 and 180 degrees. As shown in FIG. 4B, when the alignment directions I1 and I2 are deflected counterclockwise by an angle $\theta 2$, the axial directions of the absorption axis A26 and A28 are also deflected counterclockwise by an angle $\theta 2$, wherein the angle $\theta 2$ is less than 20 degrees.

Figure 5A:
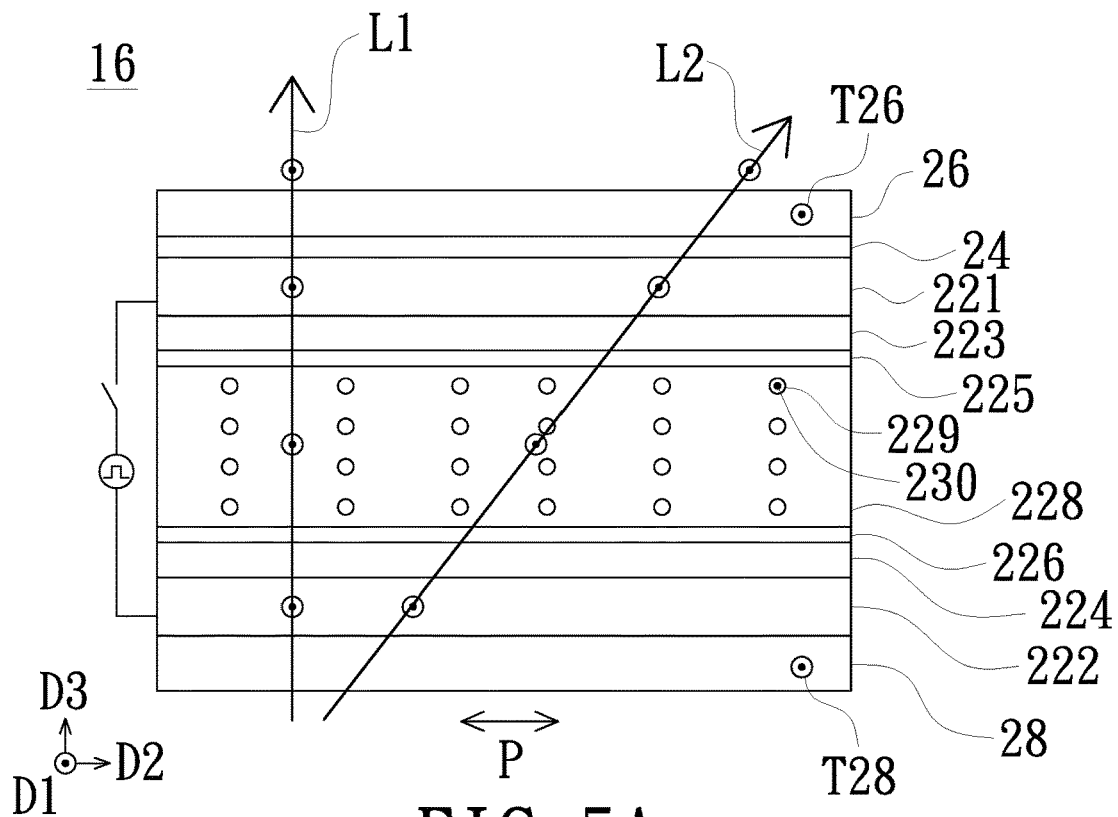
FIG. 5A and FIG. 5B are schematic cross-sectional views of the electrically controlled viewing angle switching device of the display device of an embodiment of the invention under the sharing mode and the anti-peeping mode, respectively.
Figure 5B:
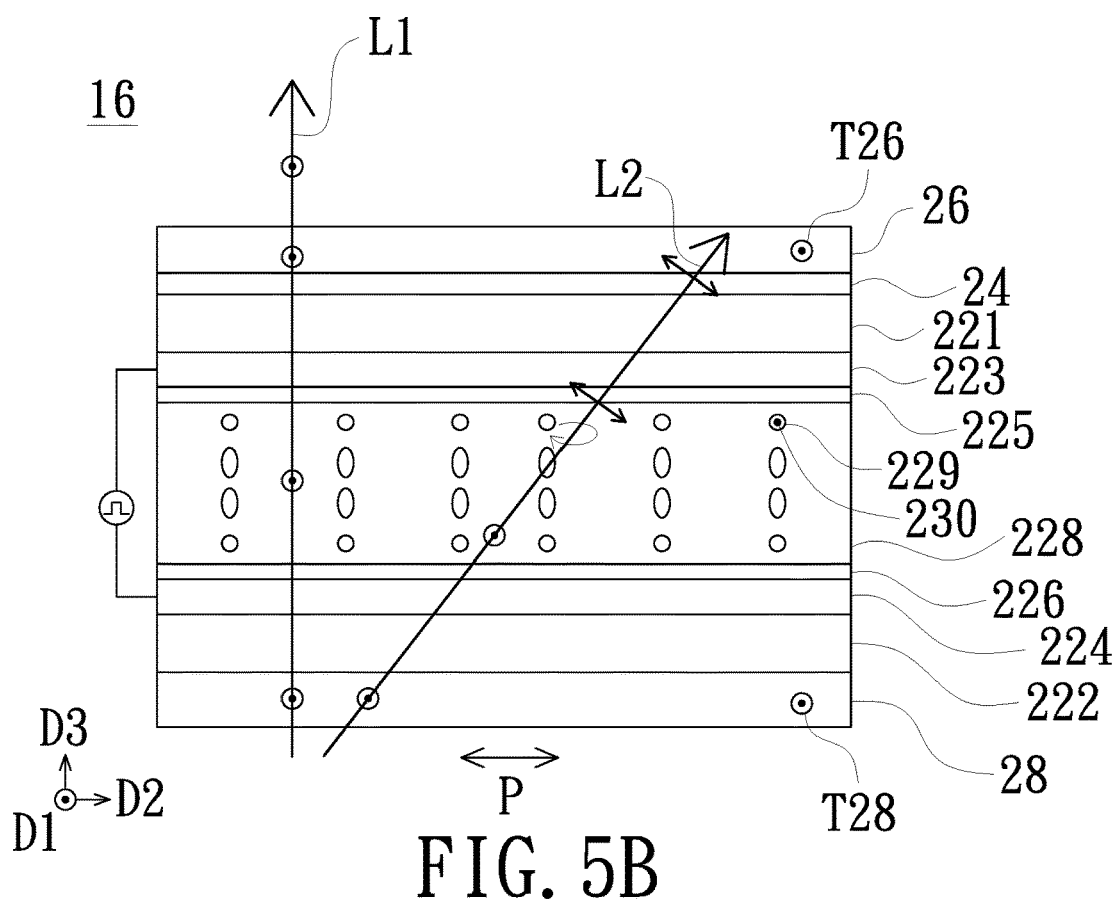

FIGS. 5A and 5B are schematic cross-sectional views of the electrically controlled viewing angle switching device of the display device of an embodiment of the invention under a sharing mode and the anti-peeping mode, respectively. It is taken as an example that the included angle between the direction B (not shown) of the optical axis 230 of the liquid crystal molecules 229 and the viewing angle control direction P is 90 degrees and both the axial direction of the transmission axis T26 of the second upper polarizer 26 and the axial direction of the transmission axis T28 of the second lower polarizer 28 are parallel to the direction B. For example, the optical axis 230 of the liquid crystal molecules 229, the transmission axis T26 of the second upper polarizer 26 and the transmission axis T28 of the second lower polarizer 28 are all parallel to a first direction D1. The viewing angle control direction P is a second direction D2, which is perpendicular to the first direction D1, and a reversed direction of the second direction D2. Also, a third direction D3 represents a stacking direction of the electrically controlled viewing angle switching device 16 and the display panel 14. The third direction D3 is perpendicular to the first direction D1 and the second direction D2. When the electrically controlled viewing angle switching device 16 is powered off, there is no voltage between the upper electrode layer 223 and the lower electrode layer 224. As shown in FIG. 5A, the optical axis 230 of the liquid crystal molecules 229 is perpendicular to the viewing angle control direction P. In such case, whether a light L1 in a central view angle (i.e. the light which enters the electrically controlled viewing angle switching device in a forward direction) or a light L2 in the viewing angle control direction (i.e. the light which enters the electrically controlled viewing angle switching device at a large angle), a polarized light generated by passing through the second lower polarizer 28 does not experience a phase transition of the liquid crystal molecules 229 and thus a polarization direction is not changed by the liquid crystal material layer 228, thereby all the lights being able to pass through the second upper polarizer 26. At this time, the display device 10 is in the sharing mode. When the electrically controlled viewing angle switching device 16 is powered on, the liquid crystal molecules 229 in the liquid crystal material layer 228 are subjected to an effect of an electric field between the upper electrode layer 223 and the lower electrode layer 224. As shown in FIG. 5B, the optical axis 230 of the liquid crystal molecules 229 rotate at an angle with the viewing angle control direction P as an axis. The lights passing through the electrically controlled viewing angle switching device 16 with different incident angles are subjected to different phase transitions at the liquid crystal material layer 228. For example, when the light L1 in the direction of central view angle passes through the liquid crystal material layer 228, the light L1 has no changed polarization direction and can therefore pass through the second upper polarizer 26. The light L2 in the viewing angle control direction entering the electrically controlled viewing angle switching device at a larger angle has changed polarization direction due to the liquid crystal material layer 228 and is unable to pass through the second upper polarizer 26. At this time, the display device 10 is in the anti-peeping mode.

Figure 6:
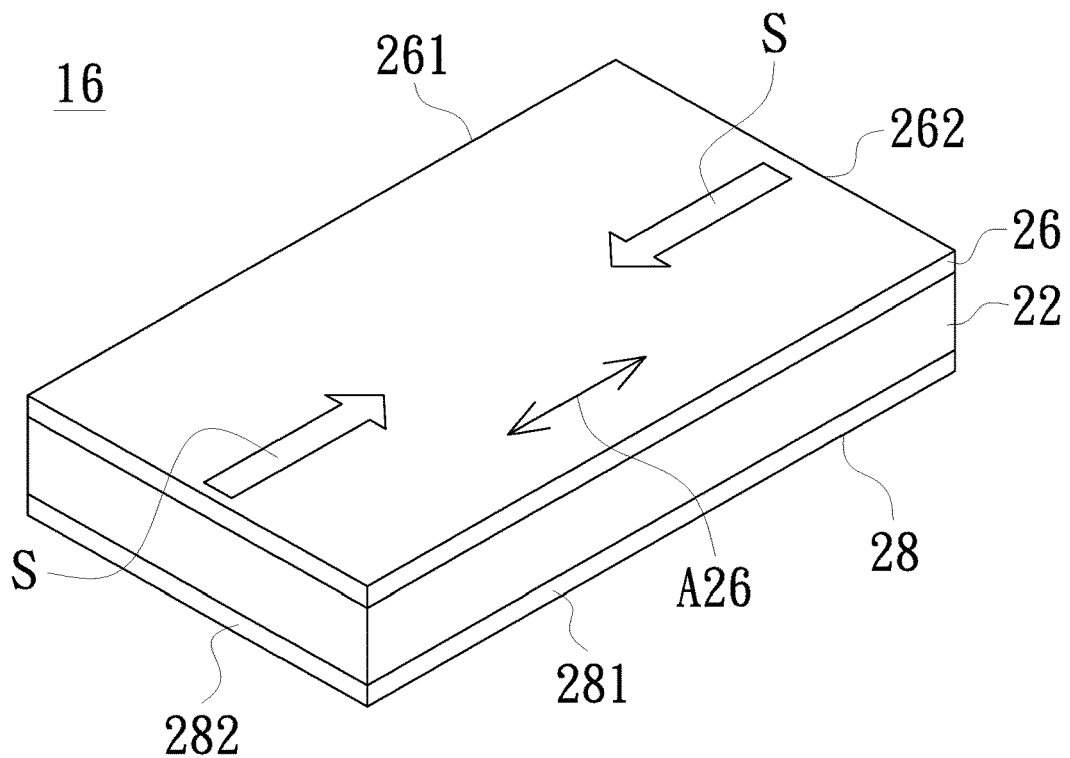
FIG. 6 is a schematic view of a configuration of a liquid crystal cell, a second upper polarizer and a second lower polarizer of the electrically controlled viewing angle switching device of an embodiment of the invention.
Figure 7:
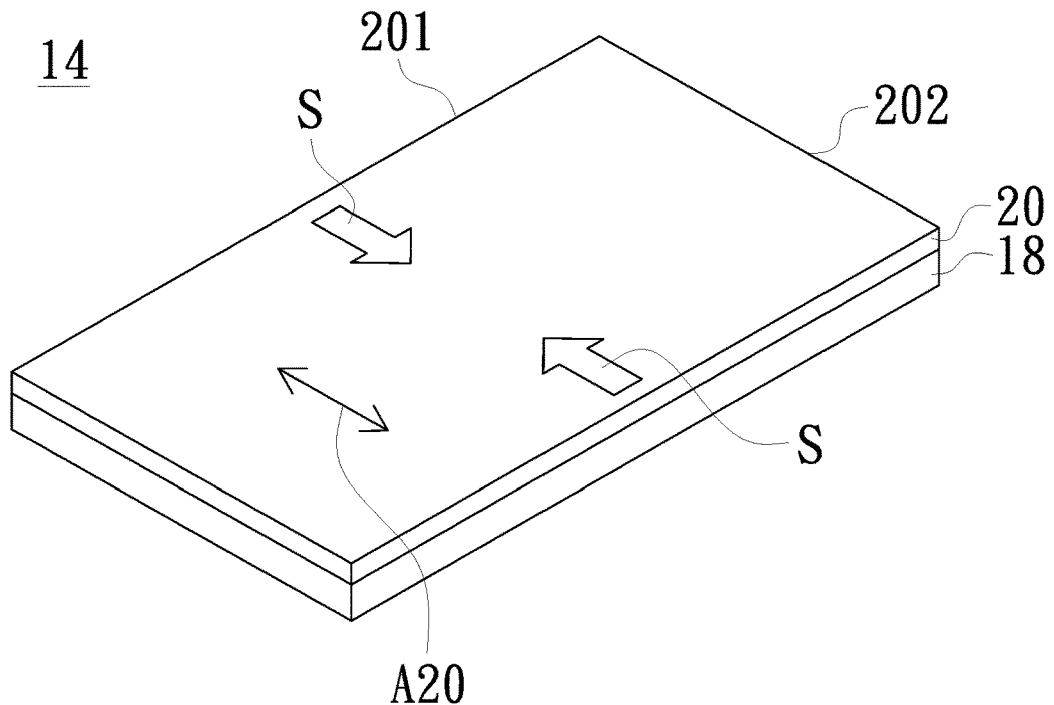
FIG. 7 is a schematic structural view of the display panel of an embodiment of the invention.

Further, as shown in FIG. 6, the second upper polarizer 26 and the second lower polarizer 28 of the electrically controlled viewing angle switching device 16 are attached above and below the liquid crystal cell 22, respectively. The second upper polarizer 26 includes two opposite long sides 261 and two opposite short sides 262. The second lower polarizer 28 includes two opposite long sides 281 and two opposite short sides 282. In one embodiment, the axial direction of the absorption axis A26 of the second upper polarizer 26 and the axial direction of the absorption axis A28 (not shown) of the second lower polarizer 28 are parallel to the long sides 261, 281 so that a stress direction S of the second upper polarizer 26 and a stress direction S of the second lower polarizer 28 counteract each other and the electrically controlled viewing angle switching device 16 is therefore not liable to warp or bend. In addition, as shown in FIG. 7, the first polarizer 20 of the display panel 14 also includes two opposite long sides 201 and two opposite short sides 202. In one embodiment, an axial direction of the absorption axis A20 of the first polarizer 20 is parallel to the short side 202 and therefore a stress direction S of the first polarizer 20 is parallel to the short side 202 so that the display panel 14 is not liable to warp or bend though only one first polarizer 20 is attached on the panel module 18.

Figure 8:
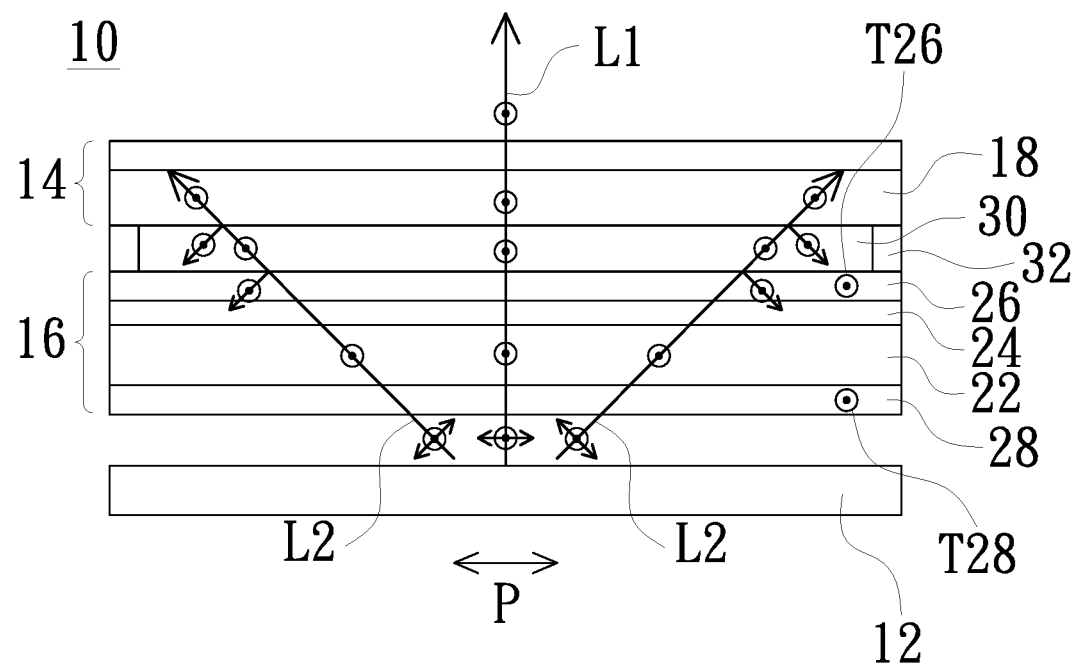
FIG. 8 is a schematic cross-sectional view of the display device of another embodiment of the invention.

FIG. 8 is a schematic cross-sectional view of the display device of another embodiment of the invention. The following is also an illustration in that both the transmission axis T26 of the second upper polarizer 26 and the transmission axis T28 of the second lower polarizer 28 are perpendicular to the viewing angle control direction P. As shown in FIG. 8, after the light L1 or the light L2 in the viewing angle control direction P emitted from the backlight module 12 passes through the second lower polarizer 28 of the electrically controlled viewing angle switching device 16, the polarization direction of the polarized light, i.e. a S-polarized light, is perpendicular to the viewing angle control direction P. Generally speaking, an interface transmittance of S-polarized light is much lower than an interface transmittance of P-polarized light. For example, taking the light L2 incident on the electrically controlled viewing angle switching device 16 at an angle of 45 degrees as an example, after the light L2 enters the electrically controlled viewing angle switching device 16, a traveling direction of the light L2 is deflected from 45 degrees to, for example, 28.1 degrees. The interface transmittance of the S-polarized light is, for example, 90.7% of the interface transmittance of the P-polarized light at an interface of the second upper polarizer 26 and the air layer 30. When the light L2 enters the air layer 30, the traveling direction of the light L2 is deflected back to 45 degrees. When the light L2 proceeds to a side of the display panel 14 adjacent to the air layer 30, the interface transmittance of the S-polarized light is, for example, 91.6% of the interface transmittance of the P-polarized light. That is, for the light L2 which enters the electrically controlled viewing angle switching device 16 at a 45-degree angle, the transmittance of the S-polarized light is about 17% lower than that of the P-polarized light and therefore the anti-peeping effect is improved. Further speaking, the air layer 30 located between the electrically controlled viewing angle switching device 16 and the display panel 14 conduces to decrease the interface transmittance of the light L2 in the viewing angle control direction (i.e. the light which enters the electrically controlled viewing angle switching device at a large angle) at the interface of the second upper polarizer 26 and the air layer 30 and the interface of the air layer 30 and the display panel 14 when the polarized light of the light L1 or the light L2 passing though the electrically controlled viewing angle switching device 16 is the S-polarized light and therefore improves the anti-peeping effect.

Continued from the above illustration, in the first embodiment, as shown in FIG. 2 and FIG. 8, the electrically controlled viewing angle switching device 16 is disposed between the display panel 14 and the backlight module 12, wherein a frame 32 with adhesiveness is disposed between the electrically controlled viewing angle switching device 16 and the display panel 14 to connect the same (the electrically controlled viewing angle switching device 16 and the display panel 14), and the air layer 30 is therefore formed between the electrically controlled viewing angle switching device 16 and the display panel 14. A thickness of the air layer 30 is such as 0.1 mm, 0.2 mm or 0.3 mm. Since a surface of the panel module 18 of the display panel 14 is generally a transparent glass surface or has an optical film attached thereon, a structure of concave-convex unevenness (not shown) is disposed on a side or a surface of the second upper polarizer 26 facing the panel module 18 to prevent Newton's ring effect when the electrically controlled viewing angle switching device 16 and the panel module 18 are too close. The structure of concave-convex unevenness is located between the second upper polarizer 26 and the panel module 18 and is able to prevent a large-area contact between the surface of the second upper polarizer 26 and the surface of the panel module 18 to prevent the Newton's ring effect. In addition, the surface of the second upper polarizer 26 having the structure of concave-convex unevenness is designed to have an exterior haze of lower than 50% to prevent a destroyed polarization state of the polarized light from the second upper polarizer 26 due to a scattering by the structure of concave-convex unevenness, which therefore results in a lowered contrast of the display panel 14. Preferably, the exterior haze of the second upper polarizer 26 is less than 20%. More preferably, the exterior haze of the second upper polarizer 26 is less than 5%.

Figure 9:
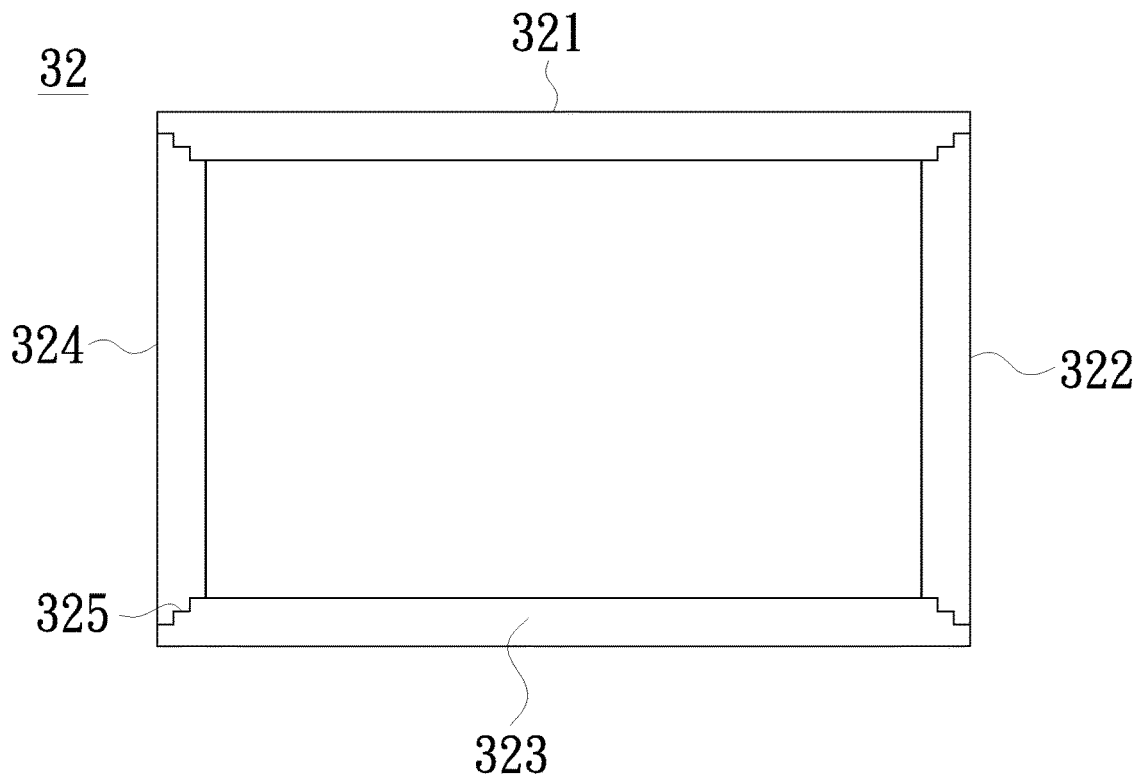
FIG. 9 is a schematic structural view of a frame of an embodiment of the invention.

The frame 32 with adhesiveness mentioned above comprises a double-sided glue having a square framed shape. The frame 32 is preferably black to shield scattered light from an optical plate below the frame 32 or from an edge of a reverse prism sheet and to prevent scattering of light on an edge of the frame 32, thereby preventing aureola on a border of a display area. In one embodiment, as shown in FIG. 9, the frame 32 comprises four frame edges 321, 322, 323 and 324. Each of the frame edges 321, 322, 323 and 324 has step structures 325 at two opposite ends. The frame edges 321, 322, 323 and 324 are connected at the ends by means of the step structures 325 so as to constitute a square framed shape. With the design of the step structures 325, the dust can be effectively prevented from entering the air layer 30 through the joints between the frame edges 321, 322, 323 and 324.

Figure 10:
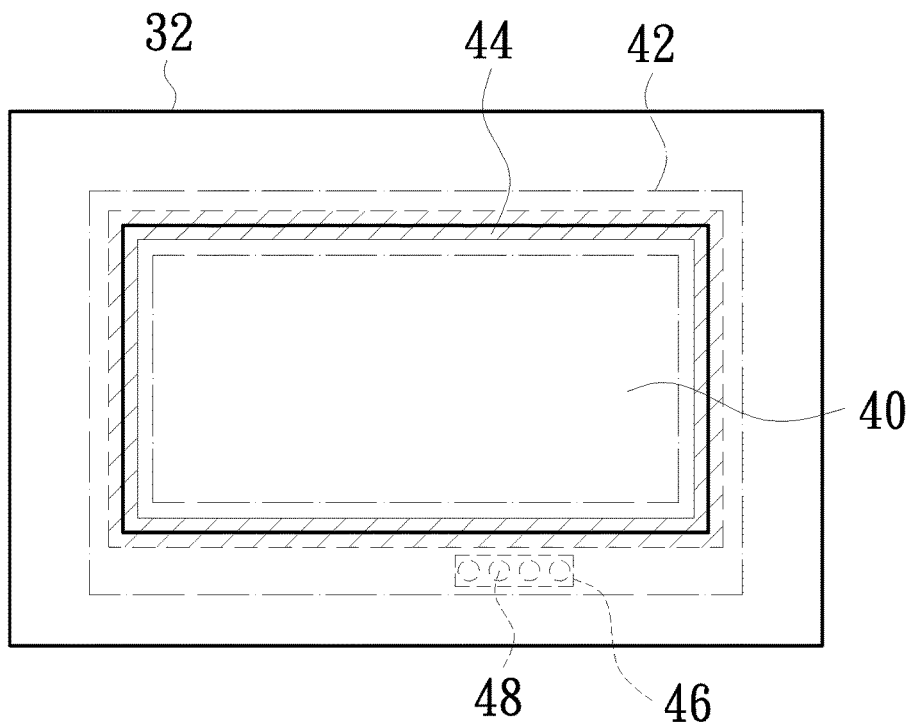
FIG. 10 is a schematic view of positions of the frame and frame glues of the liquid crystal cell of an embodiment of the invention.

Referring to FIG. 10, a position of the frame 32 is further illustrated together with the structure of the liquid crystal cell. FIG. 10 is a schematic view of positions of the frame and frame glues of the liquid crystal cell according to an embodiment of the invention. As shown in FIG. 10, the liquid crystal cell 22 has a display area 40 and a frame glue area 42. The frame glue area 42 surrounds the display area 40, wherein the liquid crystal material layer 228 (shown in FIG. 3) of the liquid crystal cell 22 is located in the display area 40. A first frame glue 44 is located in the frame glue area 42 between the upper substrate 221 (shown in FIG. 3) and the lower substrate 222 (shown in FIG. 3) and surrounds the display area 40 to seal the liquid crystal material layer 228. In one embodiment, the frame 32 is disposed between the electrically controlled viewing angle switching device 16 (shown in FIG. 2) and the display panel 14 (shown in FIG. 2), and surrounds the frame glue area 42 and overlaps partially with the frame glue area 42, particularly overlapping partially with the first frame glue 44. Both the frame 32 and the first frame glue 44 are black. Through the disposition of the black first frame glue 44 and the black frame 32, the aureola on a periphery of the display device 10 can be effectively shielded.

Further, as shown in FIG. 10, in addition to the first frame glue 44 which is disposed in the frame glue area 42 between the upper substrate 221 and the lower substrate 222 to seal the liquid crystal material layer 228, a second frame glue 46 is disposed in the frame glue area 42. The second frame glue 46 is only disposed at a local position of the frame glue area 42. A plurality of conductive balls 48 such as gold balls are distributed in the second frame glue 46 so that the upper electrode layer 223 (shown in FIG. 3) and the lower electrode layer 224 (shown in FIG. 3) are electrically connected through the conductive balls 48 while the upper substrate 221 is connected to the lower substrate 222 by the second frame glue 46. In one embodiment, a drive signal of the lower electrode layer 224 is originated from an external signal, which is electrically separated by the upper electrode layer 223 and then conducted to the lower electrode layer 224 through the conductive balls 48 in the second frame glue 46. In such design, an electrical connection area between the upper electrode layer 223 and the lower electrode layer 224 is electrically separated from other areas of the upper electrode layer 223 to serve as a signal entry area of the lower electrode layer 224. In another embodiment, a drive signal of the upper electrode layer 223 is originated from an external signal, which is electrically separated by the lower electrode layer 224 and then conducted to the upper electrode layer 223 through the conductive balls 48 in the second frame glue 46. In such design, an electrical connection area between the lower electrode layer 224 and the upper electrode layer 223 is electrically separated from other areas of the lower electrode layer 224 to serve as a signal entry area of the upper electrode layer 223.

Continued from the above illustration, in the invention, the phase compensation film 24 of the electrically controlled viewing angle switching device 16 may be a Negative C-plate, an A-plate and a Bi-axial plate. The phase compensation film 24 may be of one-layer film or stacked film (i.e. being multilayer film construction) but not limited thereto. No matter what kind of phase compensation film 24 is used, a compensation value of the in-plane retardation ($R_o$) thereof is between 0 nm and 150 nm, and a compensation value of the out-of-plane retardation ($R_{th}$) thereof is between 100 nm and 600 nm. The lower the $R_o$, the better. The optimal $R_{th}$ is 400 nm. The phase compensation film 24 improves the anti-peeping range of the electrically controlled viewing angle switching device 16.

Since the A-plate and the Bi-axial plate are of directivity, a refractive index distribution of the Bi-axial plate must satisfy Nx>Ny>Nz when the phase compensation film 24 is the Bi-axial plate, wherein Nx, Ny and Nz represent refractive indexes of the Bi-axial plate in the x-axis, the y-axis and the z-axis, respectively, and a thickness direction of the phase compensation film 24 is in the z-axis direction. The phase compensation film 24 may comprise stacking multiple layers of Bi-axial plates. The Bi-axial plates can be located such as between the second upper polarizer 26 and the liquid crystal cell 22 (as shown in FIG. 2), or between the second lower polarizer 28 and the liquid crystal cell 22. The Bi-axial plates can also be located both between the liquid crystal cell 22 and the second upper polarizer 26, and between the liquid crystal cell 22 and the second lower polarizer 28. The x-axis direction of each Bi-axial plate forms an included angle of 0±30 degrees with the absorption axis A26/A28 or the transmission axis T26/T28 of the adjacent second upper polarizer 26/second lower polarizer 28, wherein a better anti-peeping effect is accomplished when the x-axis direction of the Bi-axial plate is parallel to the absorption axis A26/A28 or the transmission axis T26/T28.

Figure 11:
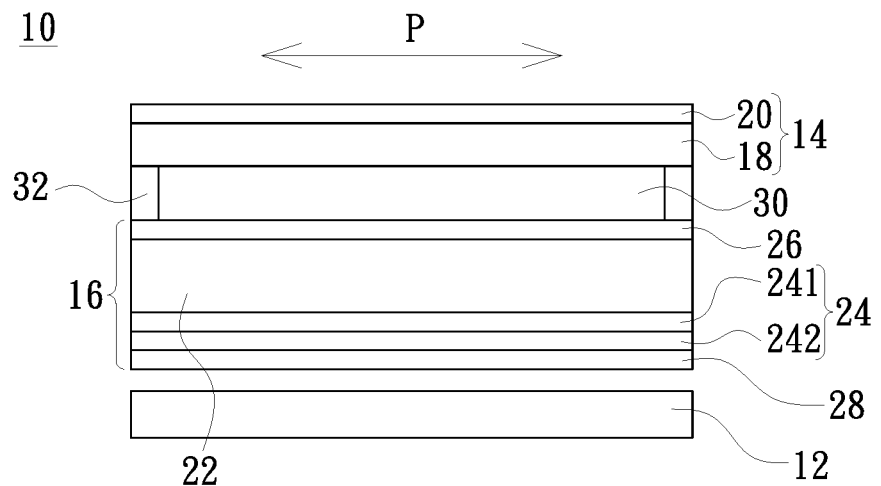
FIG. 11 is another schematic cross-sectional view of the display device of the first embodiment of the invention.

When the phase compensation film is the A-plate, a pair of A-plates is required. In one embodiment, as shown in FIG. 11, the phase compensation film 24 comprises a first A-plate 241 and a second A-plate 242. An included angle between an optical axis (not shown in the figure) of the first A-plate 241 and an optical axis (not shown in the figure) of the second A-plate 242 is 90±20 degrees. The first A-plate 241 is disposed between the second lower polarizer 28 and the liquid crystal cell 22, and an included angle between the optical axis of the first A-plate 241 and the absorption axis A28 (not shown in the figure) of the second lower polarizer 28 is 45±10 degrees. The second A-plate 242 is disposed between the second lower polarizer 28 and the first A-plate 241, and an included angle between the optical axis of the second A-plate 242 and the absorption axis A28 (not shown in the figure) of the second lower polarizer 28 is 45±10 degrees. A better anti-peeping effect is accomplished when the included angle between the optical axis of the first A-plate 241 (the second A-plate 242) and the absorption axis A26 (A28) of the second upper polarizer 26 (the second lower polarizer 28) is 45 degrees. When the $R_o$ and the $R_{th}$ of the first A-plate 241 and the second A-plate 242 are low and do not reach the above mentioned values, an elevated $R_o$ and an elevated $R_{th}$ can be reached by stacking a plurality of first A-plates 241 and/or a plurality of second A-plates 242.

In addition to a disposition of the phase compensation film 24 to improve the anti-peeping effect of the display device 10, in one embodiment, the structure of the backlight module 12 is also one of the factors that prevent a decreased anti-peeping effect. Please refer to FIG. 1. The backlight module 12 comprises a light source and an optical plate. The light source in the embodiment is such as a linear light source assembly 50. The optical plate is such as a light guide plate 52. The light guide plate 52 has a light-incident surface 521 and a light-emitting surface 522. In the first embodiment, the light-emitting surface 522 is disposed opposite to the electrically controlled viewing angle switching device 16 but not limited thereto. In the display device 10A of the second embodiment to be described later, the light-emitting surface 522 is disposed opposite to the display panel 14. As shown in FIG. 1, the linear light source assembly 50 is disposed beside the light-incident surface 521. The linear light source assembly 50 comprises a plurality of light-emitting diodes 501 arranged along a predetermined direction C1, and the predetermined direction C1 is parallel to the viewing angle control direction P. In one embodiment, the backlight module 12 further comprises a reverse prism sheet 54 disposed on the light-emitting surface 522. The reverse prism sheet 54 has a plurality of prisms 541 arranged in parallel. The prisms 541 face the light-emitting surface 522 and extending directions C2 of the prisms 541 are parallel to the viewing angle control direction P.

Figure 12:
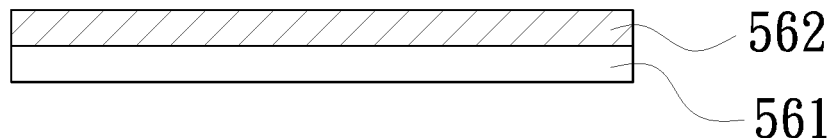
FIG. 12 is a schematic cross-sectional view of a reflector of an embodiment of the invention.

Continued from the above illustration, the backlight module 12 further comprises a reflector 56 disposed at an opposite side of the light-emitting surface 522 of the light guide plate 52, i.e. the reflector 56 is disposed below the light guide plate 52. FIG. 12 is a schematic cross-sectional view of the reflector of one embodiment of the invention. As shown in the figure, the reflector 56 comprises a substrate 561 and a metal layer 562. The metal layer 562 is formed on the substrate 561. The metal layer 562 is a silver metal layer or an aluminum metal layer, so that the reflector 56 is not a white reflector in order to prevent scattering of reflected light due to the use of a white reflector, which results in a deficiency of decreased anti-peeping effect caused by the increase of large-angle light of the backlight module 12.

Figure 13:
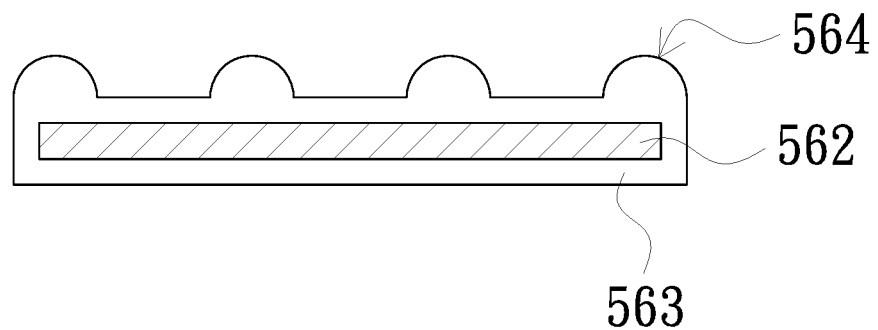
FIG. 13 is a schematic cross-sectional view of the reflector of another embodiment of the invention.
Figure 14A:
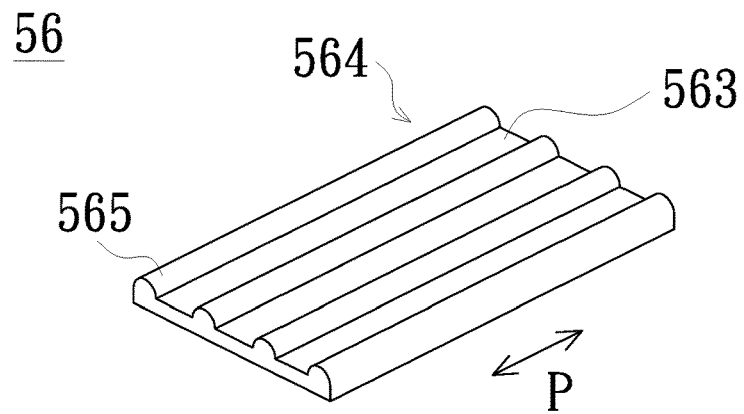
FIG. 14A, FIG. 14B and FIG. 14C are respectively schematic views of microstructure patterns of the reflector of an embodiment of the invention.
Figure 14B:
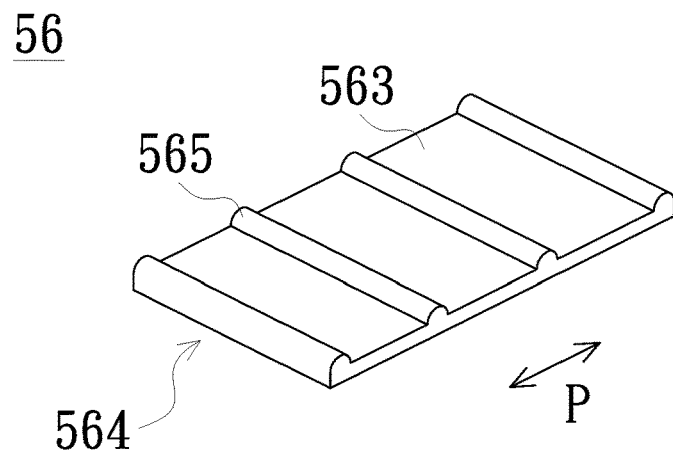
Figure 14C:
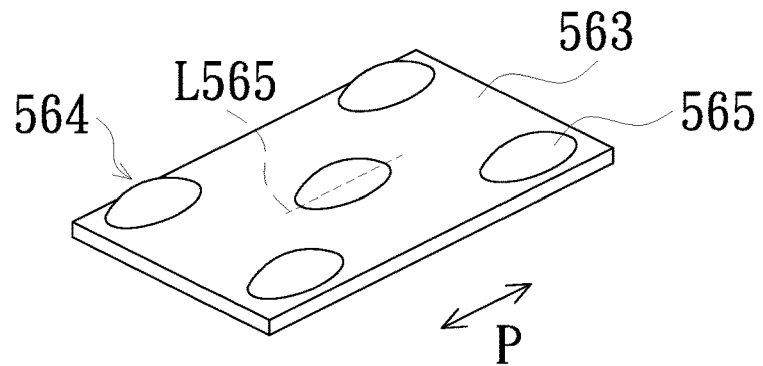

FIG. 13 is a schematic cross-sectional view of the reflector of another embodiment of the invention. As shown in the figure, the reflector 56 comprises a metal layer 562 and a protection layer 563. The metal layer 562 is a silver metal layer or an aluminum metal layer. The protection layer 563 covers the metal layer 562. A microstructure pattern 564 is formed on a side of the protection layer 563 facing the light guide plate 52 (shown in FIG. 1). Since the microstructure pattern 564 is asymmetrical to scattered light, adjustment of the microstructure pattern 564 requires consideration of the viewing angle control direction P, so as to have a lower proportion of scattered light in the viewing angle control direction P. FIG. 14A, FIG. 14B, and FIG. 14C are schematic views of the microstructure patterns of the reflector respectively according to one embodiment of the invention. As shown in FIG. 14A, the microstructure pattern 564 comprises a plurality of strip-like convex portions 565, and an extension direction of each strip-like convex portion 565 is parallel to the viewing angle control direction P. As shown in FIG. 14B, the microstructure pattern 564 comprises a plurality of strip-like convex portions 565, and an extension direction of each strip-like convex portion 565 is perpendicular to the viewing angle control direction P. As shown in FIG. 14C, the microstructure pattern 564 comprises a plurality of convex portions 565, and each convex portion 565 has an elliptical shape, and a long axis L565 of the elliptical shape is parallel to the viewing angle control direction P. In other embodiment, the reflector 56 can also be a specular reflector (ESR) having multilayer film construction.

The reflector 56 of the embodiment is characterized by low scattering. In one embodiment, a ratio of a light scattered by the reflector 56 to a light not scattered by the reflector 56 is less than 0.25. Therefore the large-angle light emitted from the backlight module 12 can be reduced, and especially the large-angle light of the backlight module 12 in the viewing angle control direction P can be reduced. In addition, the design of the protection layer 563 mentioned above can prevent the reflector 56 from being damaged during transportation or during assembly into the backlight module 12.

Figure 17:
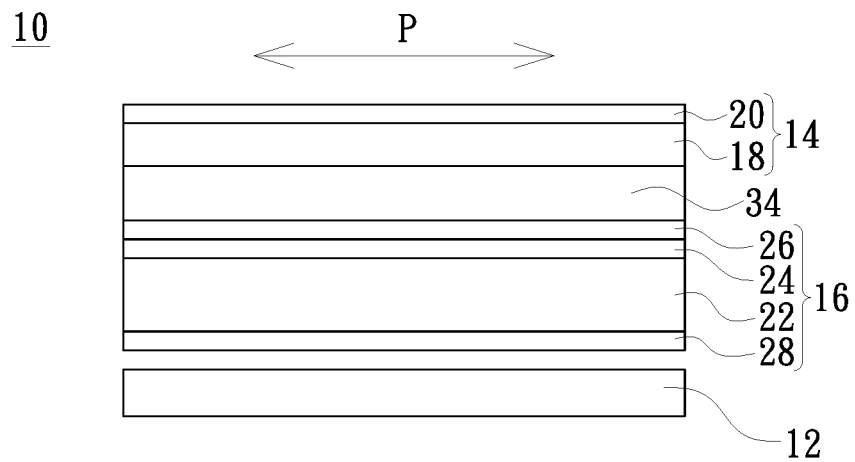
FIG. 17 is another schematic cross-sectional view of the display device of the first embodiment of the invention.

Continued from the above illustration, in the first embodiment, as shown in FIG. 2, FIG. 8 and FIG. 11, the electrically controlled viewing angle switching device 16 is disposed between the display panel 14 and the backlight module 12, wherein a frame 32 with adhesiveness is disposed between the electrically controlled viewing angle switching device 16 and the display panel 14 to connect the same (the electrically controlled viewing angle switching device 16 and the display panel 14), and the air layer 30 is therefore formed between the electrically controlled viewing angle switching device 16 and the display panel 14. As shown in FIG. 17, alternatively, there is no air layer 30 and frame 32 between the electrically controlled viewing angle switching device 16 and the display panel 14. Moreover, there is a bonding layer 34 between the electrically controlled viewing angle switching device 16 and the display panel 14.

Figure 18:
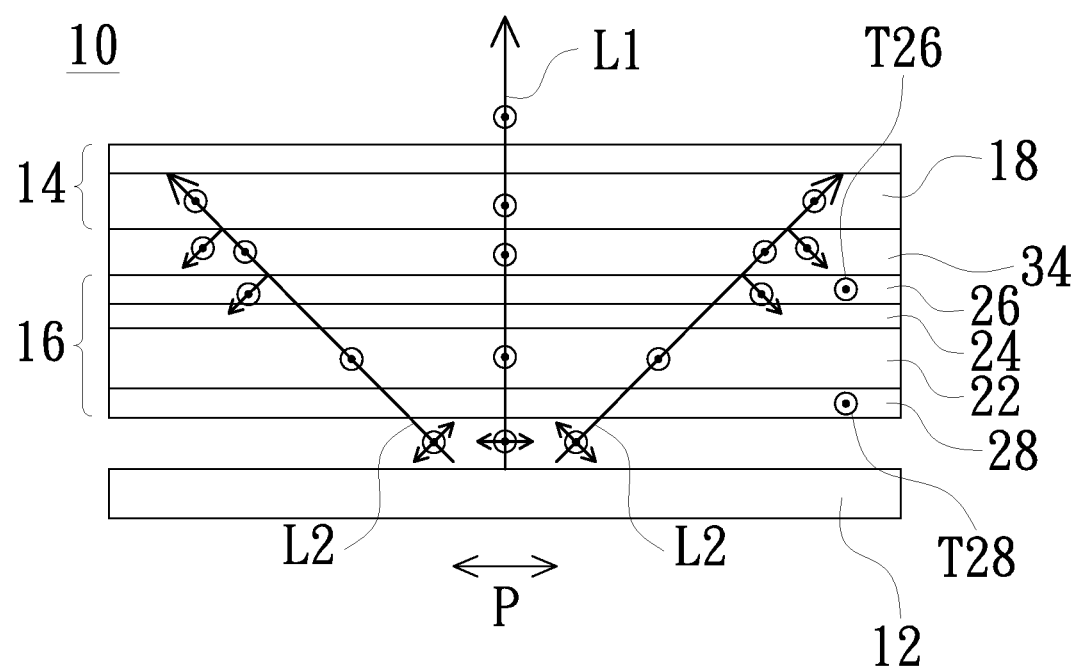
FIG. 18 is another schematic cross-sectional view of the display device of the embodiment shown in FIG. 17.

As shown in FIG. 18, when the light L2 proceeds from 16 to the bonding layer 34 and then proceeds to a side of the display panel 14 adjacent to the bonding layer 34, if the refraction index of the bonding layer 34 is equal to or less than the second upper polarizer 26 of the electrically controlled viewing angle switching device, the transmittance of the S-polarized light is lower than that of the P-polarized light. Further speaking, the bonding layer 34 with lower refraction index located between the electrically controlled viewing angle switching device 16 and the display panel 14 conduces to decrease the interface transmittance of the light L2 in the viewing angle control direction when the polarized light of the light L1 or the light L2 passing though the electrically controlled viewing angle switching device 16 is the S-polarized light and therefore improves the anti-peeping effect.

Figure 15:
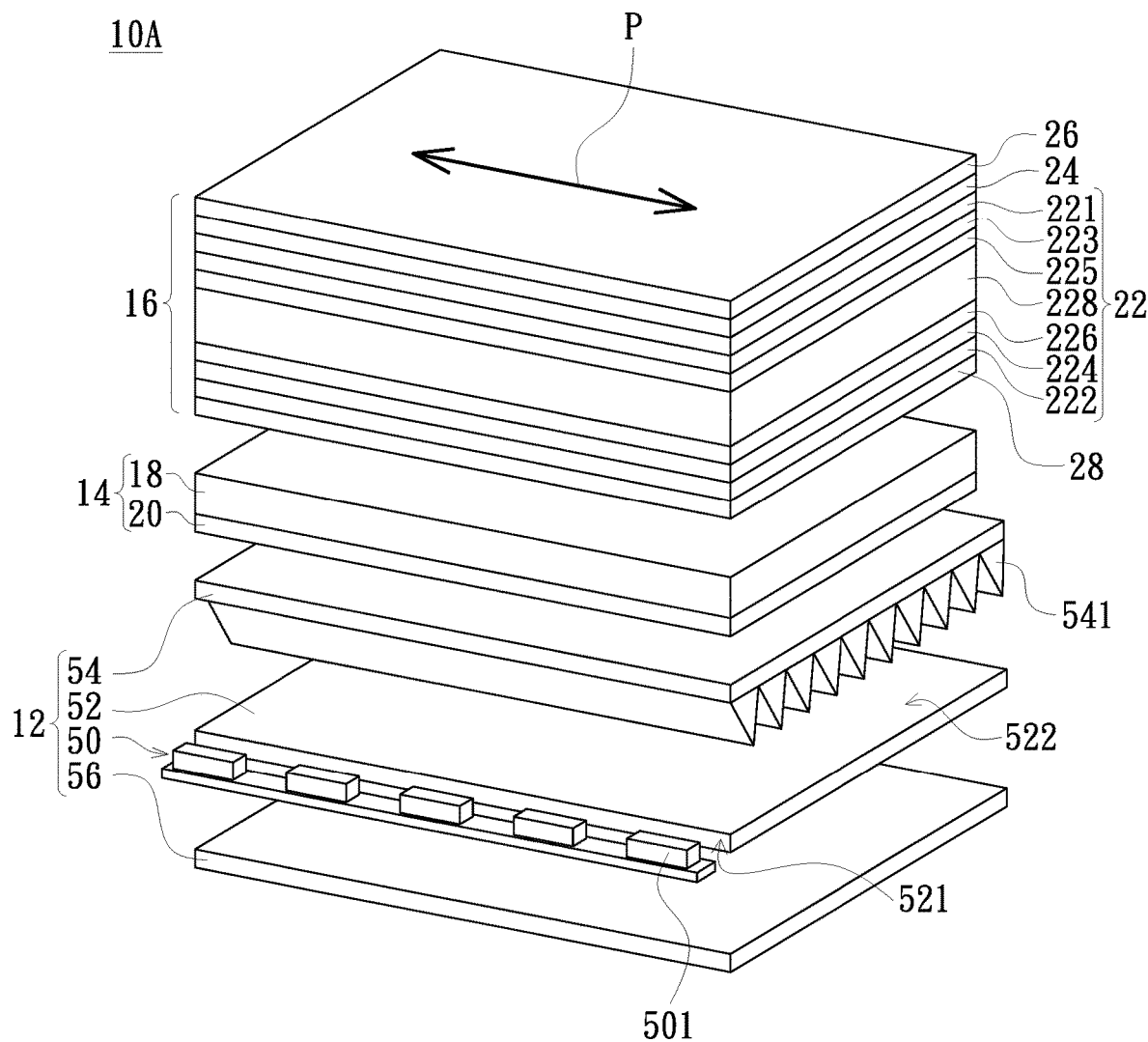
FIG. 15 is a schematic explosive view of the display device of a second embodiment of the invention.

FIG. 15 is a schematic explosive view of the display device of a second embodiment of the invention. As shown in the figure, the display device 10A comprises the backlight module 12, the display panel 14 and the electrically controlled viewing angle switching device 16. A difference from the first embodiment is that in the second embodiment, the display panel 14 is between the backlight module 12 and the electrically controlled viewing angle switching device 16, and the light-emitting surface 522 of the optical plate (such as the light guide plate 52) of the backlight module 12 is disposed opposite to the display panel 14. Regarding the switching modes of the electrically controlled viewing angle switching device 16, the formation of the air layer 30 between the display panel 14 and the electrically controlled viewing angle switching device 16, and the structure of the backlight module 12, they are the same as or similar to those in the first embodiment and are not further elaborated herein. Furthermore, air layer 30 can be a bonding layer 34 with lower refraction index.

Figure 16:
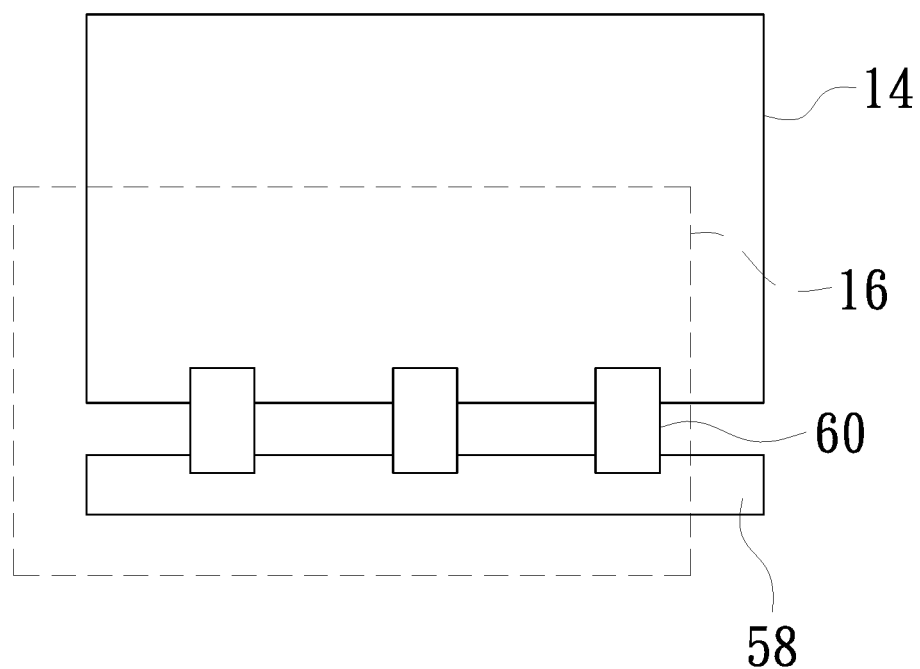
FIG. 16 is a schematic view of the display panel and the electrically controlled viewing angle switching device connected to a circuit board according to an embodiment of the invention.

FIG. 16 is a schematic view of the display panel and the electrically controlled viewing angle switching device connected to a circuit board according to an embodiment of the invention. As shown in FIG. 16, the display device 10/10A further comprises a circuit board 58 having a control circuit assembly and a plurality of flexible printed circuit 60. The display panel 14 and the electrically controlled viewing angle switching device 16 are electrically connected to the circuit board 58 by using the flexible printed circuit 60 so that the display panel 14 and the electrically controlled viewing angle switching device 16 are driven and controlled by the control circuit assembly of the circuit board 58.

In view of illustration set forth above, the invention can achieve the following effects:
1) When the display device of the embodiment is in use, a viewing angle of images of the display device can be switched by the electrically controlled viewing angle switching device to accomplish the switching between the anti-peeping mode and the sharing mode. The display device of the embodiment improves the disadvantage of inconvenient use caused by the conventional requirement that the optical film must be manually placed on or removed from the display panel to achieve anti-peeping or sharing demands.
2) The anti-peeping effect can be enhanced through the selection and the disposition of the phase compensation film and the improvement of the structure of the reflector.
3) The electrically controlled viewing angle switching device is not liable to warp or bend and has a longer lifespan.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first polarizer, the second polarizer, the first A-plate, the second A-plate, the second upper polarizer, the second lower polarizer, the first frame glue, and the second frame glue are only used for distinguishing various elements and do not limit the number of the elements.

What is claimed is:

1. A display device, having a viewing angle control direction, wherein the display device comprises:
   a backlight module;
   a display panel, disposed on the backlight module, wherein the display panel comprises a panel module and a first polarizer; and
   an electrically controlled viewing angle switching device, disposed on the backlight module and disposed in a stacking manner with the display panel, wherein there is an air layer between the electrically controlled viewing angle switching device and the display panel, the panel module is disposed between the first polarizer and the electrically controlled viewing angle switching device, the electrically controlled viewing angle switching device comprises a liquid crystal cell, at least one phase compensation film and two second polarizers, the liquid crystal cell is disposed between the two second polarizers, and the at least one phase compensation film is disposed at least between one of the two second polarizers and the liquid crystal cell;
   wherein the liquid crystal cell comprises:
      two substrates, disposed between the two second polarizers;
      two electrode layers, disposed between the two substrates;
      two alignment layers, disposed between the two electrode layers; and
      a liquid crystal material layer, disposed between the two alignment layers, wherein the liquid crystal material layer comprises a plurality of liquid crystal molecules, and a direction of an optical axis of the plurality of liquid crystal molecules and the viewing angle control direction have an included angle θ1 of 70-110 degrees;
   wherein two alignment directions of the two alignment layers and the viewing angle control direction have an included angle of 90±20 degrees and an included angle of 270±20 degrees, respectively, and included angles between directions of transmission axis of the two second polarizers and alignment directions of the two alignment layers are selected from one of 0±5 degrees and 90±5 degrees.

2. The display device according to claim 1, wherein transmission axis of the two second polarizers are parallel.

3. The display device according to claim 1, wherein the backlight module comprises a light source and an optical plate, the optical plate has a light-incident surface and a light-emitting surface, and the light source is disposed beside the light-incident surface, the light source comprises a linear light source assembly, the linear light source assembly comprises a plurality of light-emitting diodes arranged along a predetermined direction, and the predetermined direction is parallel to the viewing angle control direction.

4. The display device according to claim 1, wherein the backlight module comprises a light source and an optical plate, the optical plate has a light-incident surface and a light-emitting surface, and the light source is disposed beside the light-incident surface, wherein the backlight module further comprises a reverse prism sheet, the reverse prism sheet is disposed on the light-emitting surface, the reverse prism sheet has a plurality of prisms arranged in parallel, the prisms face the light-emitting surface of the optical plate, and extending directions of the prisms are parallel to the viewing angle control direction.

5. The display device according to claim 1, wherein the backlight module comprises a light source, an optical plate and a reflector, the optical plate has a light-incident surface and a light-emitting surface, and the light source is disposed beside the light-incident surface, the reflector is disposed at an opposite side of the light-emitting surface of the optical plate.

6. The display device according to claim 5, wherein the reflector comprises a substrate and a metal layer formed on the substrate, and the metal layer is a silver metal layer or an aluminum metal layer.

7. The display device according to claim 5, wherein the reflector comprises:
   a metal layer, being a silver metal layer or an aluminum metal layer; and
   a protection layer, covering the metal layer, wherein a microstructure pattern is formed on a side of the protection layer facing the optical plate.

8. The display device according to claim 7, wherein the microstructure pattern comprises a plurality of convex portions parallel to the viewing angle control direction.

9. The display device according to claim 7, wherein the microstructure pattern comprises a plurality of convex portions perpendicular to the viewing angle control direction.

10. The display device according to claim 7, wherein the microstructure pattern comprises a plurality of convex portions, any one of the convex portions has an elliptical shape, and a long axis of the elliptical shape is parallel to the viewing angle control direction.

11. The display device according to claim 7, wherein a ratio of a light scattered by the reflector to a light not scattered by the reflector is less than 0.25.

12. The display device according to claim 5, wherein the reflector comprises a specular reflector, wherein the specular reflector has multilayer film construction.

13. A display device, having a viewing angle control direction, wherein the display device comprises:
a backlight module;
a display panel, disposed on the backlight module, wherein the display panel comprises a panel module and a first polarizer; and
an electrically controlled viewing angle switching device, disposed on the backlight module and disposed in a stacking manner with the display panel, wherein there is an air layer between the electrically controlled viewing angle switching device and the display panel, the panel module is disposed between the first polarizer and the electrically controlled viewing angle switching device, the electrically controlled viewing angle switching device comprises a liquid crystal cell, at least one phase compensation film and two second polarizers, the liquid crystal cell is disposed between the two second polarizers, and the at least one phase compensation film is disposed at least between one of the two second polarizers and the liquid crystal cell;
wherein a compensation value of the in-plane retardation ($R_o$) of the at least one phase compensation film is between 0 nm and 150 nm, and a compensation value of the out-of-plane retardation ($R_{th}$) of the at least one phase compensation film is between 100 nm and 600 nm.

14. The display device according to claim 13, wherein the at least one phase compensation film comprises a Negative C-plate.

15. The display device according to claim 13, wherein the two second polarizers are a second upper polarizer and a second lower polarizer, respectively, the at least one phase compensation film comprises a first A-plate and a second A-plate, the first A-plate is disposed between the second lower polarizer and the liquid crystal cell, the second A-plate is disposed between the second lower polarizer and the first A-plate, and an included angle between an optical axis of the first A-plate and an optical axis of the second A-plate is 90±20 degrees.

16. The display device according to claim 15, wherein an included angle between the optical axis of the first A-plate and an absorption axis of the second upper polarizer is 45±10 degrees, and an included angle between an optical axis of the second A-plate and an absorption axis of the second lower polarizer is 45±10 degrees.

17. The display device according to claim 13, wherein the at least one phase compensation film comprises a Bi-axial plate, the Bi-axial plate has a refractive index distribution of Nx>Ny>Nz, wherein Nx, Ny and Nz represent refractive indexes of the Bi-axial plate in a x-axis, a y-axis and a z-axis, respectively, and a z-axis direction is a thickness direction of the phase compensation film.

18. The display device according to claim 17, wherein the Bi-axial plate is located at least between one of the two second polarizers and the liquid crystal cell, and an included angle between a x-axis direction of the Bi-axial plate and one of an absorption axis and a transmission axis of the adjacent second polarizer is 0±30 degrees.

19. The display device according to claim 1, wherein the electrically controlled viewing angle switching device is disposed between the display panel and the backlight module, and transmission axis of the two second polarizers are perpendicular to the viewing angle control direction.

20. The display device according to claim 1, wherein, one of the two second polarizers facing the display panel is provided with a structure of concave-convex unevenness on a side thereof facing the display panel.

21. The display device according to claim 1, wherein an exterior haze of one of the two second polarizers facing the display panel is lower than 50%.

22. The display device according to claim 1, further comprising a frame with adhesiveness connecting the electrically controlled viewing angle switching device and the display panel to form the air layer.

23. The display device according to claim 22, wherein the frame comprises four frame edges, any one of the four frame edges has step structures at two opposite ends, respectively, and two of the frame edges are connected at the ends by the step structures to constitute a square framed shape.

24. The display device according to claim 22, wherein the liquid crystal cell has a display area and a frame glue area surrounding the display area, the frame is located between the electrically controlled viewing angle switching device and the display panel and overlaps partially with the frame glue area, and the liquid crystal cell comprises:
two substrates, disposed between the two second polarizers;
two electrode layers, disposed between the two substrates;
two alignment layers, disposed between the two electrode layers;
a liquid crystal material layer, disposed between the two alignment layers and located in the display area;
a first frame glue, located in the frame glue area between the two substrates and surrounding the display area;
a second frame glue, located in a portion of the frame glue area between the two substrates; and
a plurality of conductive balls, distributed in the second frame glue, wherein the two electrode layers are electrically connected through the conductive balls.

25. The display device according to claim 24, wherein the frame and the first frame glue are black.

26. The display device according to claim 1, further comprising a circuit board having a control circuit assembly and a plurality of flexible printed circuit, wherein the display panel and the electrically controlled viewing angle switching device are electrically connected to the circuit board by using the flexible printed circuit.

27. The display device according to claim 1, wherein each of the first polarizer and the two second polarizers comprises two opposite long sides and two opposite short sides, an axial direction of an absorption axis of the first polarizer is parallel to the two short sides, and axial directions of absorption axis of the two second polarizers are parallel to the two long sides.

28. A display device, having a viewing angle control direction, wherein the display device comprises:
a backlight module;

a display panel, disposed on the backlight module, wherein the display panel comprises a panel module and a first polarizer; and an electrically controlled viewing angle switching device, disposed on the backlight module and disposed in a stacking manner with the display panel, wherein there is a bonding layer between the electrically controlled viewing angle switching device and the display panel, the panel module is disposed between the first polarizer and the electrically controlled viewing angle switching device, the electrically controlled viewing angle switching device comprises a liquid crystal cell, at least one phase compensation film and two second polarizers, the liquid crystal cell is disposed between the two second polarizers, and the at least one phase compensation film is disposed at least between one of the two second polarizers and the liquid crystal cell, wherein the refraction index of the bonding layer is equal to or less than the refraction index of the two second polarizer of the electrically controlled viewing angle switching device;

wherein the liquid crystal cell comprises:
two substrates, disposed between the two second polarizers;
two electrode layers, disposed between the two substrates;
two alignment layers, disposed between the two electrode layers; and
a liquid crystal material layer, disposed between the two alignment layers, wherein the liquid crystal material layer comprises a plurality of liquid crystal molecules, and a direction of an optical axis of the plurality of liquid crystal molecules and the viewing angle control direction have an included angle θ1 of 70-110 degrees;

wherein two alignment directions of the two alignment layers and the viewing angle control direction have an included angle of 90±20 degrees and an included angle of 270±20 degrees, respectively, and included angles between directions of transmission axis of the two second polarizers and alignment directions of the two alignment layers are selected from one of 0±5 degrees and 90±5 degrees.

29. A display device, having a viewing angle control direction, wherein the display device comprises:

a backlight module;

a display panel, disposed on the backlight module, wherein the display panel comprises a panel module and a first polarizer; and an electrically controlled viewing angle switching device, disposed on the backlight module and disposed in a stacking manner with the display panel, wherein there is a bonding layer between the electrically controlled viewing angle switching device and the display panel, the panel module is disposed between the first polarizer and the electrically controlled viewing angle switching device, the electrically controlled viewing angle switching device comprises a liquid crystal cell, at least one phase compensation film and two second polarizers, the liquid crystal cell is disposed between the two second polarizers, and the at least one phase compensation film is disposed at least between one of the two second polarizers and the liquid crystal cell;

wherein the refraction index of the bonding layer is equal to or less than the refraction index of the two second polarizer of the electrically controlled viewing angle switching device;

wherein a compensation value of the in-plane retardation ($R_o$) of the at least one phase compensation film is between 0 nm and 150 nm, and a compensation value of the out-of-plane retardation ($R_{th}$) of the at least one phase compensation film is between 100 nm and 600 nm.

* * * * *